(12) United States Patent
Salaun et al.

(10) Patent No.: US 7,715,402 B2
(45) Date of Patent: May 11, 2010

(54) METHOD AND DEVICE FOR PROCESSING DIGITAL DATA

(75) Inventors: Frédéric Salaun, Saint Aubin du Cormier (FR); Franck Abelard, Saint Armel (FR)

(73) Assignee: Thomson Licensing, Boulogne-Billancourt (FR)

( * ) Notice: Subject to any disclaimer, the term of this patent is extended or adjusted under 35 U.S.C. 154(b) by 990 days.

(21) Appl. No.: 10/522,219

(22) PCT Filed: Jul. 8, 2003

(86) PCT No.: PCT/EP03/07332

§ 371 (c)(1),
(2), (4) Date: Sep. 16, 2005

(87) PCT Pub. No.: WO2004/013859

PCT Pub. Date: Feb. 12, 2004

(65) Prior Publication Data

US 2006/0101502 A1  May 11, 2006

(30) Foreign Application Priority Data

Jul. 24, 2002 (FR) .................................. 02 09786

(51) Int. Cl.
*H04L 12/28* (2006.01)
(52) U.S. Cl. ...................... 370/394; 370/412
(58) Field of Classification Search .................. 370/394, 370/412
See application file for complete search history.

(56) References Cited

U.S. PATENT DOCUMENTS

| | | | |
|---|---|---|---|
| 6,064,676 A | 5/2000 | Slattery et al. | |
| 6,233,648 B1 | 5/2001 | Tomita | |
| 6,343,170 B1 * | 1/2002 | Sela | 385/37 |
| 6,628,719 B1 * | 9/2003 | Kono et al. | 375/240.28 |
| 6,687,298 B1 * | 2/2004 | Ikekawa | 375/240.15 |
| 6,801,536 B1 * | 10/2004 | Foster et al. | 370/412 |
| 6,834,155 B1 | 12/2004 | Taniguchi | |
| 6,950,443 B1 * | 9/2005 | Kaneko | 370/474 |
| 6,950,466 B2 * | 9/2005 | Kim et al. | 375/240.12 |
| 7,113,542 B2 * | 9/2006 | Tanaka | 375/240.01 |

(Continued)

FOREIGN PATENT DOCUMENTS

| | | |
|---|---|---|
| FR | 2253434 | 6/1975 |
| GB | 2349460 | 11/2000 |
| JP | 8-181944 A | 7/1996 |
| JP | 10-150629 A | 6/1998 |
| JP | 10-257436 A | 9/1998 |

(Continued)

OTHER PUBLICATIONS

Search Report dated Oct. 24, 2003.

(Continued)

*Primary Examiner*—Andrew Lee
(74) *Attorney, Agent, or Firm*—Robert D. Shedd; Harvey D. Fried; Joel M. Fogelson (57) ABSTRACT

The invention relates to a device and a method for processing digital data descriptors stored in the form of description units of predetermined size. The method is such that:
  description units are constructed and stored in memory buffers prior to their recording on a recording medium,
  description units are utilized simultaneously with the construction and with the recording of description units of the same stream,
  one and the same memory buffer is used for the construction and the utilization of the description unit. Application to methods of delayed reading.

14 Claims, 5 Drawing Sheets

U.S. PATENT DOCUMENTS

| | | | |
|---|---|---|---|
| 7,199,798 | B1 | 4/2007 | Echigo et al. |
| 7,274,862 | B2* | 9/2007 | Komori ........................ 386/99 |
| 7,333,714 | B2* | 2/2008 | Hu .............................. 386/68 |
| 2001/0022892 | A1* | 9/2001 | Nakagawa ................... 386/68 |
| 2001/0031002 | A1* | 10/2001 | Hashimoto et al. ...... 375/240.03 |
| 2002/0018580 | A1* | 2/2002 | Maeda ....................... 382/100 |
| 2002/0069288 | A1* | 6/2002 | Rising et al. ................ 709/231 |
| 2002/0071490 | A1* | 6/2002 | Tsuboi .................. 375/240.15 |
| 2002/0114388 | A1* | 8/2002 | Ueda et al. ............. 375/240.01 |
| 2002/0122358 | A1* | 9/2002 | Tada et al. ............... 369/30.23 |
| 2003/0053795 | A1* | 3/2003 | Ando .......................... 386/95 |
| 2003/0147561 | A1* | 8/2003 | Faibish et al. .............. 382/245 |
| 2003/0165320 | A1* | 9/2003 | Ogawa et al. ................. 386/52 |

FOREIGN PATENT DOCUMENTS

| | | |
|---|---|---|
| JP | 11-194899 A | 7/1999 |
| JP | 2000-92445 A | 3/2000 |
| JP | 2001-52448 A | 2/2001 |
| JP | 2002-112149 A | 4/2002 |
| WO | WO 00/45335 A1 | 8/2000 |
| WO | WO 01/26375 A1 | 4/2001 |

OTHER PUBLICATIONS

Zentaro Takeda, "Dynamic Picture Delivery Technology of FOMA", ASCII, Japan, K.K. ASCII, Nov. 1, 2001, vo. 25, pp. 155-160.

Anonymous, "DVD Analysis, DVD and Visual CD", Chuan-Haw Publishing Company, Jun. 1998.

* cited by examiner

METHOD AND DEVICE FOR PROCESSING DIGITAL DATA

This application claims the benefit, under 35 U.S.C. § 365 of International Application PCT/EP03/07332, filed Jul. 8, 2003, which was published in accordance with PCT Article 21(2) on Feb. 12, 2004 in English and which claims the benefit of French patent application No. 0209786, filed Jul. 24, 2002.

FIELD OF THE INVENTION

The present invention concerns a method and a device for processing digital data.

The invention applies more particularly to the processing of audio video data.

When a video document is coded with the aid of digital data and stored on a recording medium, it is known to process these data in such a way as to allow a user to modify the direction and/or the speed of display of the document during its readout from the recording medium. Subsequently in the document, a given direction and given speed of display are considered to define a mode of display.

A known method of implementing various modes of display demands the production in memory and the storage of data that describe the digital video stream recorded.

Figure 1:
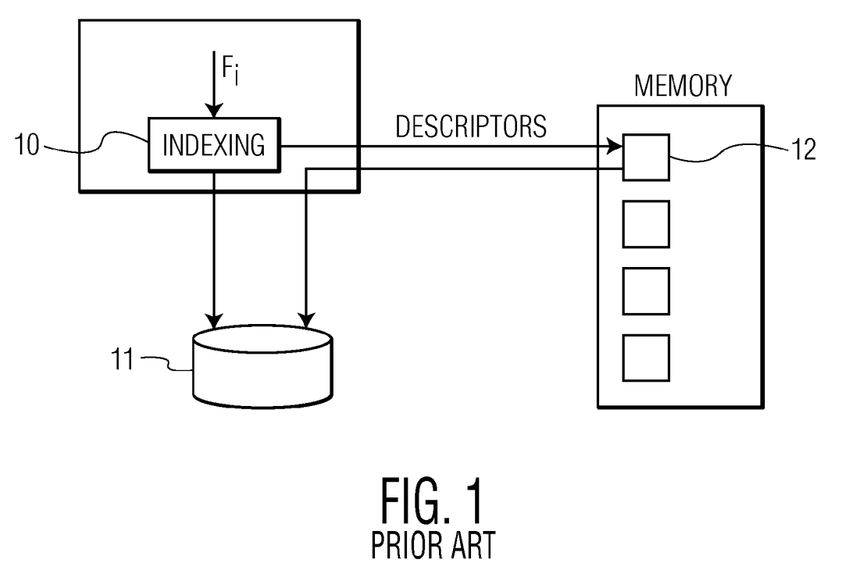
FIG. 1, already described, represents a device implementing the recording of descriptors on a recording medium according to the prior art.

For a stream coded according to the MPEG standard (the acronym standing for <<Motion Picture Expert Group>>), these data consist of the accumulation of descriptors of the syntaxes defined by the MPEG standard (Sequences, Pictures, GOPs (the acronym standing for <<Group Of Pictures>>), PES (the acronym standing for <<Packet Elementry Streams>>) Packets). A descriptor consists of a type identifying it (Sequence, Picture, GOP or PES packet, of useful attributes (<<open>> or <<closed>> for the GOP, alignment for the PES packets, type of prediction for the image, etc. . . . ) and of information regarding the location of the syntax described in the recorded stream so that this syntax can be found again on the recording medium. Thus, in FIG. 1, although the digital video stream Fi and the associated components pass through an indexing unit 10 before currently being stored on a recording medium (CD, DVD, hard disk etc. . . . ) 11, the indexing information produced by the indexing unit 10 is translated into descriptors and placed in a memory buffer 12 before this information is itself saved on a recording medium 11.

Figure 2:
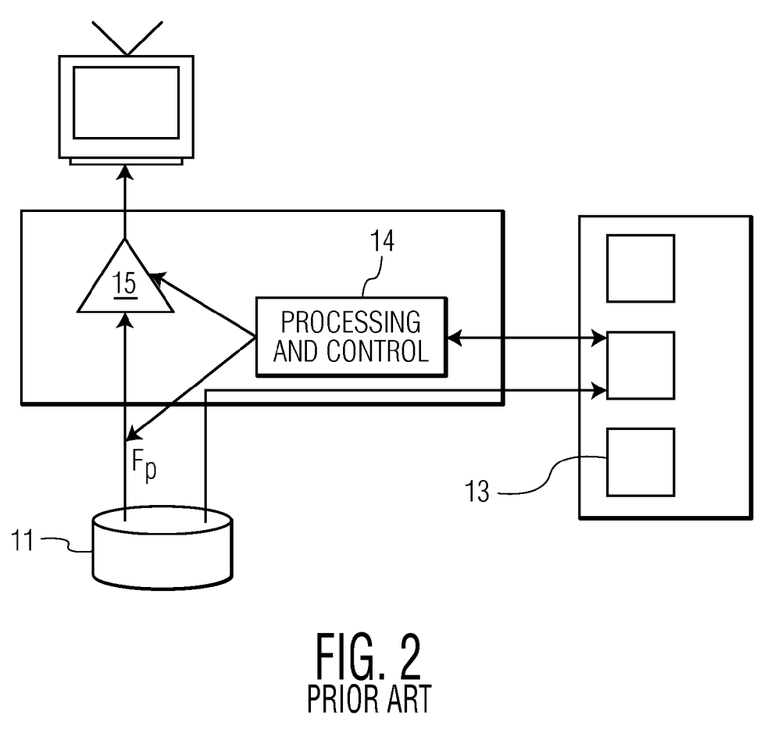
FIG. 2, already described, represents a device implementing the readout of descriptors onto a recording medium according to the prior art.

In FIG. 2, during the readout of the data in the recording medium 11, the descriptors stored in the recording medium 11 are reloaded into a memory buffer 13 then processed by a controller 14 so as to carry out the mode of display required while suitably feeding a decoder 15 with the images of the stream Fp recorded on a recording medium 11.

Figure 3:
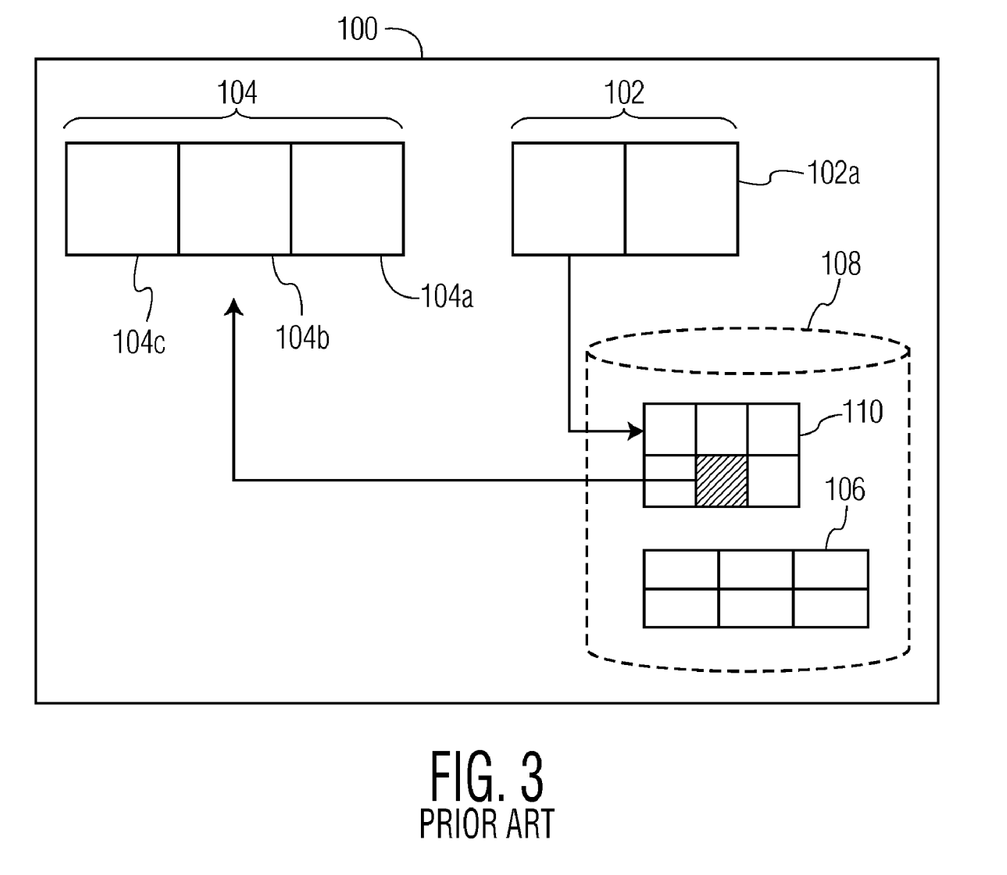
FIG. 3, already described, represents the manner of operation of a device making it possible to use various modes of display of video data coded under the MPEG format.

In FIG. 3, a device 100 using various modes of display generally comprises a random access memory containing at least two buffers 102 and 104 used, respectively, to perform the storage of the descriptors, and to perform the reading of these descriptors and also comprises a recording medium 108.

The storage of the descriptors on the recording medium 108 is organized into description units 110 of maximum predefined size of 32 kbytes that can be saved or reloaded between the recording medium 108 and the memory buffers 102 and 104. This solution makes it possible to retain only a small segment of the descriptors in memory during their acquisition or their utilization and to place them on the recording medium 108 or to load them from the recording medium 108 as and when required. The units 106 represent the storage units for the video data associated with the descriptors, stored in the description units 110.

It follows that during the recording of a digital video stream on the recording medium 108, the descriptors produced enter into the construction of a description unit in a memory buffer 102. As soon as the description unit fulfils the conditions required for its saving, it is stored on the recording medium 108, and the construction of a new description unit commences.

During the simultaneous readout of the stream currently being recorded, the description units necessary for the analysis of the recorded stream are loaded from the recording medium 108 into memory 104. 3 memory buffers 104*a*, 104*b*, 104*c* are used for this purpose and managed like the rows of a cache memory so as to retain the last descriptors analysed in memory during the analysis of a new descriptor. This mechanism facilitates the changes of direction in the analysis of the stream which would necessitate rapid reloading of the last streams analysed.

The present invention results from the finding that, when a description unit is being formed, the images whose descriptors are currently being stored are not accessible until the description unit is on the recording medium, this possibly taking several seconds or tens of seconds. In the case of images coded according to the MPEG standard, if the size of the descriptors is of the order of 40 bytes, that each PES packet, each MPEG image, and each MPEG sequence are indexed, at a rate of 12 images per sequence, more than 10 seconds of video will be described in a 32 kbyte storage unit. It is then necessary to wait more than 10 seconds to view a program after the start of its recording, this being very penalizing when undertaking delayed readout close to live recording.

For this purpose the invention proposes a method of processing digital data descriptors stored in the form of description units of predetermined size, in which description units are constructed and stored in memory buffers prior to their recording on a recording medium, description units are utilized simultaneously with the construction and with the recording of description units of the same stream, characterized in that one and the same memory buffer is used for the construction and the utilization of the description units.

According to a preferred embodiment, the data being grouped in sequence, the descriptors associated with these data also being grouped in sequence, a description unit is constructed from at least one sequence containing at least one descriptor, each description unit containing only complete sequences of descriptors.

In a description unit, the descriptors are grouped in logical sequences such that the processing, also called the utilization, of a sequence of descriptors does not necessitate the descriptors of another sequence. Thus, in the case of a stream coded according to the MPEG standard, all the descriptors referring to the syntaxes contained in one and the same MPEG sequence belong to one and the same logical sequence: descriptor of the sequence, of the GOP, of all the images that it contains and of the PES packets which contain these images.

According to a preferred embodiment, a complete description unit is transferred from a memory buffer onto the recording medium when the room available in the memory buffer is less than the memory room required to record therein a complete descriptor sequence.

Thus, a description unit is saved on the recording medium when the remaining room in the memory buffer is not sufficient to contain another sequence of descriptors of the same size.

According to a preferred embodiment, when the sequences of descriptors are of variable size, a description unit is transferred from the memory buffer onto the recording medium when on concluding the addition of a descriptor into the memory buffer, the memory buffer is full.

According to a preferred embodiment, following the recording of complete sequences of descriptors of a memory buffer to the recording medium, the descriptors contained at the end of the memory buffer and belonging to an incomplete sequence of descriptors are transferred to the start of the memory buffer.

According to a preferred embodiment, on concluding the storage of a description unit in the recording medium, a new description unit is constructed in the memory buffer associated with the said description unit if the description units contained in this memory buffer are not currently being utilized and in another memory buffer if these description units are currently being utilized According to a preferred embodiment, on concluding the utilization of a description unit, if the next description unit is not yet accessible on the recording medium, then the description unit currently being constructed is utilized.

According to a preferred embodiment, when a description unit is simultaneously currently being constructed and utilized in one and the same memory buffer, only the complete sequences of descriptors are utilized.

The invention also relates to a computer program product comprising program code instructions for the execution of the steps of the method of processing digital data descriptors according to the invention, when the said program is executed on a computer.

The invention also relates to a device for processing digital data descriptors stored in the form of description units of predetermined size, comprising
  means for constructing and for storing in memory buffers description units prior to their recording on a recording medium,
  means for utilizing the description units simultaneously with the construction and with the recording of description units of the same stream.
  According to the invention,
  the means of construction and of utilization are designed to use one and the same memory buffer for the construction and the utilization of the description units.

BRIEF DESCRIPTION OF THE DRAWINGS

Other characteristics and advantages of the invention will become apparent in the description given hereinbelow, without limitation, with reference to the following figures.

DETAILED DESCRIPTION OF A PREFERRED EMBODIMENT

Figure 4:
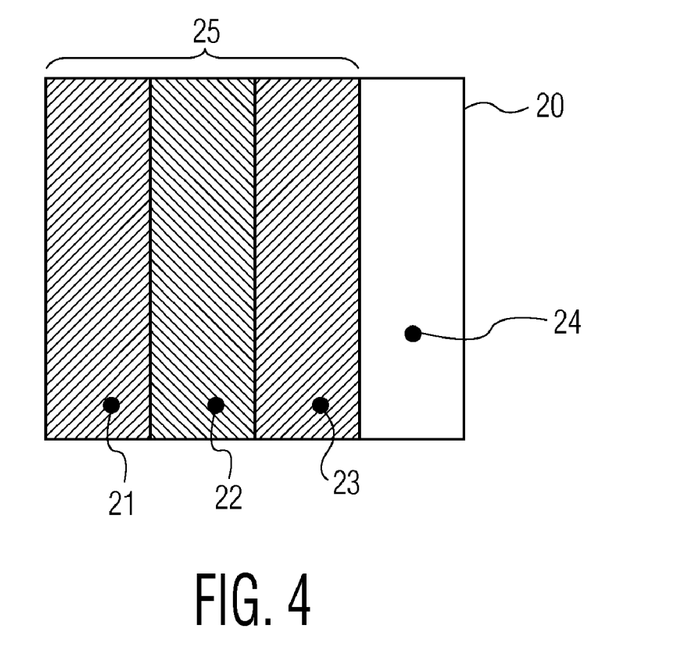
FIG. 4 represents a first configuration of the memory buffers according to an embodiment of the invention.

In FIG. 4, the memory buffer 20 contains three sequences of descriptors 21, 22, and 23. Since the last descriptor entering into the sequence 23 has just been placed in the memory buffer 20, it is apparent that the remaining room 24 in the memory buffer 20 is not sufficient to contain a descriptor sequence of the size of the sequence 23. One therefore deduces that, in this case, the description unit 25 consisting of the sequences of descriptors 21, 22 and 23 is complete and can be saved on the recording medium.

Figure 5:
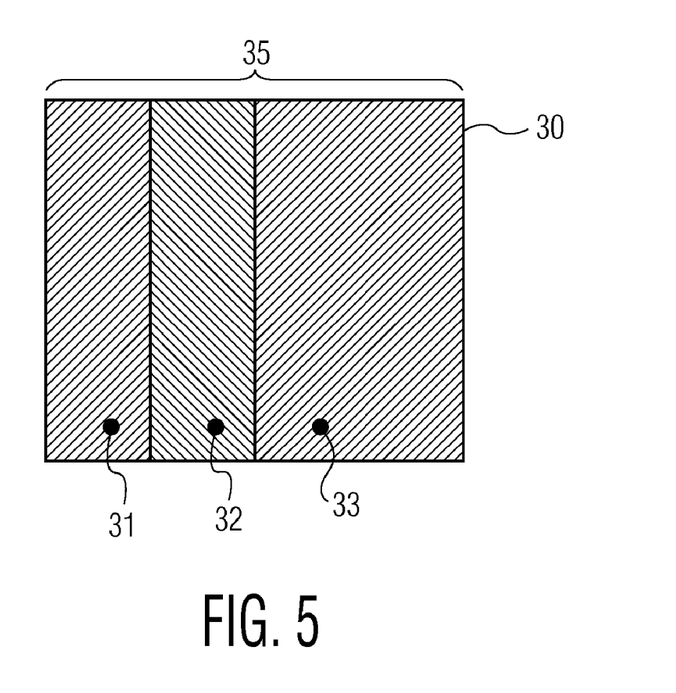
FIG. 5 represents a second configuration of the memory buffers according to an embodiment of the invention.

FIG. 5 represents a case of configuration in which the sequences of descriptors do not all have the same sizes.

When the sequences of descriptors do not always have the same size, this making it difficult to estimate the room necessary for their complete storage, a description unit is saved when there is no longer any room in the memory buffer serving for its construction. In this case, the description unit is saved immediately with the complete sequences of which it consists. The incomplete sequence remaining at the end of the memory buffer is then copied over into the new construction buffer and constitutes the start of the new description unit.

The memory buffer 30 contains three sequences of descriptors 31, 32, and 33. The last descriptor produced, entering into the sequence 33, has just been placed in the memory buffer 30 which is now full. The sequences 31 and 32 therefore constitute a complete description unit 35 which is saved on the recording medium. The incomplete sequence 33 is copied over to the start of a memory buffer and will belong to the next description unit.

This procedure has the advantage of not requiring a memory buffer of a size greater than the maximum predefined size of the description units. It will make it possible to use memory buffers of the same size either to construct the storage units during recording or to process the storage unit during readout.

Specifically, during the readout of the video stream simultaneously with its recording, it is advantageous to be able to process the description unit which is currently being constructed so as to be able to display the associated video which, for its part, has already been saved on the recording medium.

Thus, if at the end of the utilization of a description unit loaded from the recording medium, it is apparent that the next description unit has not yet been saved on the recording medium, it is then necessary to be able to process the description unit which is currently being constructed. One then accesses the memory buffer presently being used for this construction.

By virtue of such a method, the descriptors currently being stored in the form of units can be accessed quickly, their transfer into a recording medium such as a hard disk not being necessary in order for them to be read accessible.

Therefore, the times required to access the descriptors during a change of mode of display are considerably reduced.

To guarantee the consistency of the descriptors used, only the descriptor sequences contained in the memory buffer and which possess the "complete" attribute may be processed. Thus, only the sequences 31 and 32 may be processed to control the mode of display. Another advantage of this method stems from the fact that the last descriptors acquired in the as yet incomplete sequence, describe video syntaxes of an indexed portion of the video stream which, however, is perhaps not as yet already available on the recording medium because of the latencies related to the mode of access to this unit. The method therefore makes it possible to guarantee consistency between the data available in the memory buffer for utilization and the associated video available on the recording medium.

It follows that, at the end of the construction and saving of a description unit, if this same description unit is utilized, another memory buffer is used to construct the next description unit. The memory buffer that has been updated from the recording medium for the longest time will then be chosen.

When the newly constructed description unit is not currently being utilized, the construction of the new description unit can continue in the same memory buffer. The data contained in the memory buffer will then be progressively replaced with those of the new description unit.

Figure 6A:
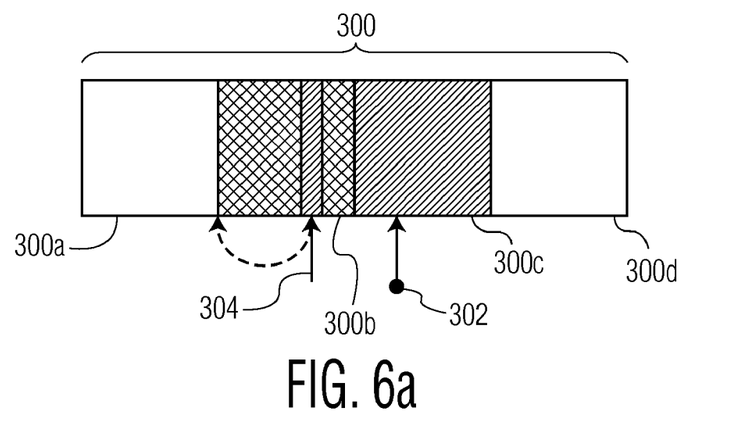
FIGS. 6a, 6b, 7a, 7b, 8a et 8b represent modes of operation of storage resources in accordance with an embodiment of the invention.

Represented in FIG. 6a is a memory 300 in accordance with an embodiment of the invention, that is to say used to generate units grouping together descriptors relating to digital video data and to read these units when a modification of the mode of display of video data is required.

In this preferred embodiment, the memory 300 is divided into four blocks 300a, 300b, 300c and 300d, each block having a single size of 32 Kbytes. Thus, the description units generated in these blocks from MPEG data descriptors have a size smaller than this value.

For this purpose, a write pointer 304 performs the storage of these descriptors in a block. In FIG. 6a, this write pointer 304 performs a storage of descriptors in a description unit formed in the block 300b.

In parallel with this, to perform the reading of a unit stored in the block 300c, a read pointer 302 is used in such a way as to transmit the information on the descriptors stored in this block 300c.

As the read pointer 302 is traversing the block 300c (FIG. 6b), the write pointer 304 stores data in the block 300b by generating a unit so that, at a given instant, the maximum size of a unit is reached.

Figure 6B:
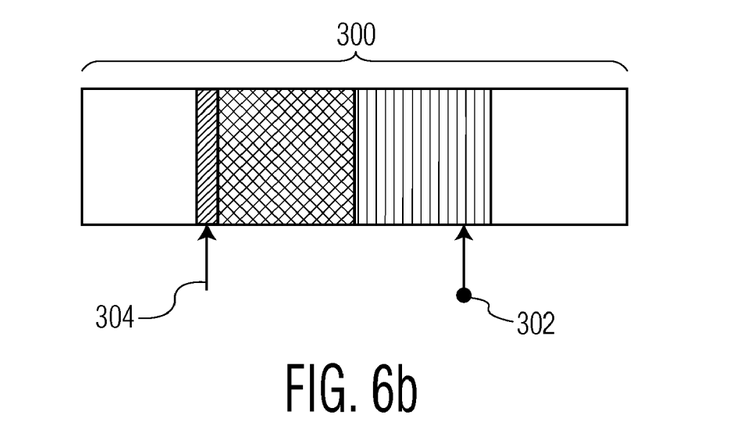

At this instant, the unit generated can be transmitted to the disk while a new unit can be generated by the pointer 304 in the block 300b (FIG. 6b).

Figure 7A:
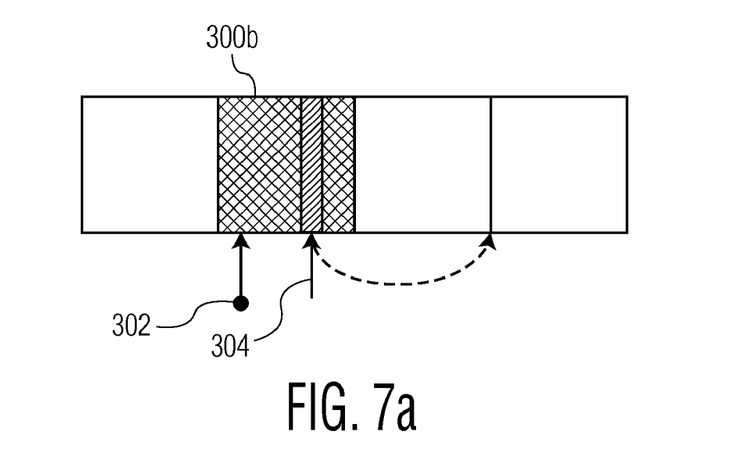

Represented in FIG. 7a is a situation such that the read pointer 302 and the write pointer 304 process information stored in the same block 300b.

As the write pointer 304 is forming a unit, the read pointer 302 reads the information contained in this unit.

Figure 7B:
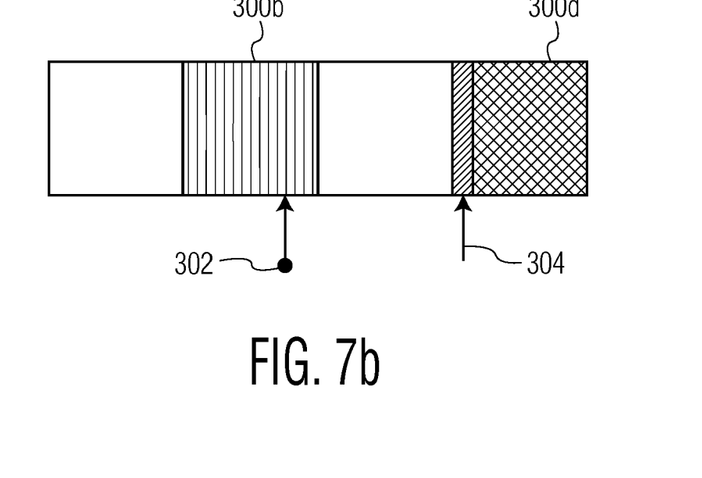

In FIG. 7b, when the maximum size of a unit is reached, the write pointer 304 uses a new block 300d to continue to form a description unit. Thus, the information stored in the block 300b is accessible to the read pointer 302 without requiring a transmission to the recording medium of the device of this unit.

In this variant of the invention, consideration is given to descriptors of MPEG data transmitted according to streams of PES packets of the same size. Hence, it is possible to forecast the instant at which a new description unit must be formed by the write pointer so that one no longer performs the transmission of information stored in a block into another block.

Figure 8A:
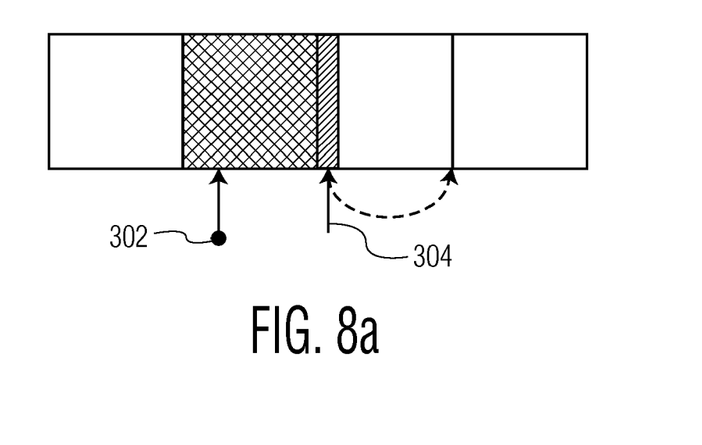

In FIG. 8a, the streams of packets or the processed groups of pictures may possibly be of variable sizes. In this case, the write pointer 304 stores these data in a block as long as the description unit formed has not reached the threshold value.

Figure 8B:
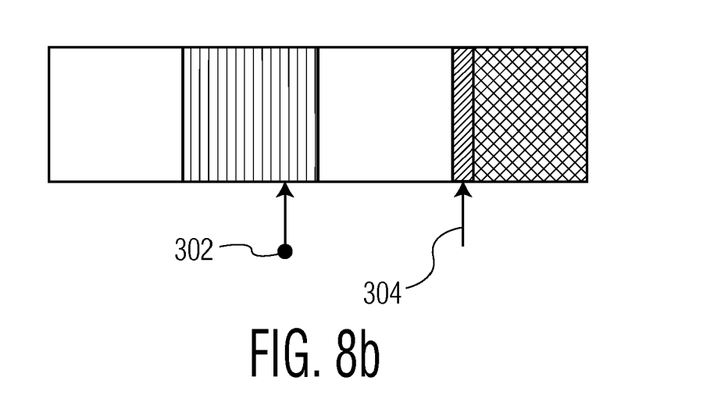

When this threshold value is reached, a maximum of two descriptors (stream descriptor and group descriptor) have to be retranscribed into a new block (FIG. 8b), in which case the timescale for reading this information is increased by only half a second.

The invention claimed is:

1. Method of processing digital data descriptors associated with a data stream, said descriptors containing structure information related to said stream and intended to be stored in the form of description units on a recording medium with said data stream, and being read together with the reading of the corresponding data stream, comprising the steps of
    writing the data stream on the recording medium,
    constructing description units and storing of these description units in at least one memory buffer prior to their recording on a recording medium,
    transferring said description units from the at least one memory buffer to the recording medium when said at least one memory buffer have reached a predetermined threshold,
    reading of said recorded data stream on the recording medium and of associated description units,
    wherein said associated description units are read from a second at least memory buffer prior to their recording when said associated description units have not yet been transferred on the recording medium.

2. Method according to claim 1 wherein the data being grouped in sequence, the descriptors associated with these data also being grouped into a sequence,
    a description unit is constructed from at least one sequence containing at least one descriptor, each description unit being of fixed size and containing only full sequences of descriptors.

3. Method according to claim 2 wherein a complete description unit is transferred from a memory buffer onto the recording medium when the room available in the memory buffer is less than the memory room required to record therein a complete descriptor sequence.

4. Method according to claim 2 wherein when the sequences of descriptors are of variable size, a description unit is transferred from the memory buffer onto the recording medium when on concluding the addition of a descriptor into the memory buffer, the memory buffer is full.

5. Method according to claim 3 wherein, following the recording of complete sequences of descriptors of a memory buffer to the recording medium, the descriptors contained at the end of the memory buffer which are not part of a complete sequence descriptors are written to the start of the memory buffer.

6. Method according to claim 3 wherein, on concluding the storage of a description unit in the recording medium, a new description unit is constructed in the memory buffer associated with the said description unit if the description units contained in this memory buffer are not currently being utilized and in another memory buffer if these description units are currently being utilized.

7. Method according to claim 4 wherein, on concluding the storage of a description unit in the recording medium, a new description unit is constructed in the memory buffer associated with the said description unit if the description units contained in this memory buffer are not currently being utilized and in another memory buffer if these description units are currently being utilized.

8. Method according to claim 5 wherein, on concluding the storage of a description unit in the recording medium, a new description unit is constructed in the memory buffer associated with the said description unit if the description units contained in this memory buffer are not currently being utilized and in another memory buffer if these description units are currently being utilized.

9. Method according to claim 1 wherein, on concluding the utilization of a description unit, if the next description unit is not yet accessible on the recording medium, then the complete sequences of the descriptors of the description unit currently being constructed is utilized before its transfer on the recording medium.

10. Method according to claim 2 wherein, on concluding the utilization of a description unit, if the next description unit is not yet accessible on the recording medium, then the complete sequences of the descriptors of the description unit currently being constructed is utilized before its transfer on the recording medium.

11. Method according to claim 3 wherein, on concluding the utilization of a description unit, if the next description unit is not yet accessible on the recording medium, then the complete sequences of the descriptors of the description unit currently being constructed is utilized before its transfer on the recording medium.

12. Method according to claim 4 wherein, on concluding the utilization of a description unit, if the next description unit is not yet accessible on the recording medium, then the complete sequences of the descriptors of the description unit currently being constructed is utilized before its transfer on the recording medium.

13. Method according to claim 5 wherein, on concluding the utilization of a description unit, if the next description unit is not yet accessible on the recording medium, then the complete sequences of the descriptors of the description unit currently being constructed is utilized before its transfer on the recording medium.

14. Device for processing digital data descriptors associated with a data stream, said descriptors containing structure information related to said stream and intended to be stored in the form of description units on a recording medium with said data stream, and being read together with the reading of the corresponding data stream, comprising
   means for writing the data stream on the recording medium,
   means of construction of description units and storing of these description units in memory buffers prior to their recording on a recording medium,
   means for transferring said description units from the memory buffers the recording medium when said memory buffers have reached a predetermined threshold,
   means for reading said recorded data stream on the recording medium and associated description units,
   wherein said associated description units are read from the memory buffers prior to their recording when they have not yet been transferred on the recording medium
   wherein said device additionally comprises means to read said data stream from the recording medium and said associated description units and when said associated description units are not yet available in the recording medium, said means read directly said associated description units in the buffer memory before their transfer on the recording medium.

* * * * *